(12) United States Patent
Nakanishi

(10) Patent No.: US 8,032,607 B2
(45) Date of Patent: Oct. 4, 2011

(54) DATA TRANSFER SYSTEM CAPABLE OF SELECTING A LOW-COST CALL TYPE

(75) Inventor: Tomoaki Nakanishi, Tokyo (JP)

(73) Assignee: NEC Corporation, Tokyo (JP)

( * ) Notice: Subject to any disclaimer, the term of this patent is extended or adjusted under 35 U.S.C. 154(b) by 1572 days.

(21) Appl. No.: 10/611,130

(22) Filed: Jul. 1, 2003

(65) Prior Publication Data

US 2004/0039792 A1 Feb. 26, 2004

(30) Foreign Application Priority Data

Jul. 3, 2002 (JP) ................... 2002-194612

(51) Int. Cl.
*G06F 15/16* (2006.01)
*H04L 12/66* (2006.01)

(52) U.S. Cl. .............. 709/217; 370/352; 370/354
(58) Field of Classification Search .......... 709/217; 370/352, 354
See application file for complete search history.

(56) References Cited

U.S. PATENT DOCUMENTS

| | | | | |
|---|---|---|---|---|
| 4,841,373 A * | 6/1989 | Asami et al. | ............. | 358/404 |
| 5,276,679 A * | 1/1994 | McKay et al. | ............. | 370/358 |
| 5,631,897 A * | 5/1997 | Pacheco et al. | ............. | 370/237 |
| 5,864,542 A * | 1/1999 | Gupta et al. | ............. | 370/257 |
| 6,333,931 B1 * | 12/2001 | LaPier et al. | ............. | 370/385 |
| 6,370,135 B1 * | 4/2002 | Gardner | ............. | 370/352 |
| 6,584,098 B1 * | 6/2003 | Dutnall | ............. | 370/354 |
| 6,744,733 B2 * | 6/2004 | Kamo | ............. | 370/236.1 |
| 7,046,683 B1 * | 5/2006 | Zhao | ............. | 370/401 |
| 7,061,902 B1 * | 6/2006 | Fukuyama et al. | ............. | 370/352 |
| 7,075,921 B2 * | 7/2006 | Siegrist et al. | ............. | 370/352 |
| 2002/0006124 A1 * | 1/2002 | Jimenez et al. | ............. | 370/352 |
| 2002/0042827 A1 * | 4/2002 | Grobler et al. | ............. | 709/227 |
| 2002/0064149 A1 * | 5/2002 | Elliott et al. | ............. | 370/352 |
| 2002/0101854 A1 * | 8/2002 | Siegrist et al. | ............. | 370/352 |
| 2002/0129147 A1 * | 9/2002 | Ogasawara | ............. | 709/225 |
| 2002/0176403 A1 * | 11/2002 | Radian | ............. | 370/352 |
| 2003/0002524 A1 * | 1/2003 | Feldman et al. | ............. | 370/465 |
| 2003/0165136 A1 * | 9/2003 | Cornelius et al. | ............. | 370/356 |
| 2003/0227893 A1 * | 12/2003 | Bajic | ............. | 370/338 |
| 2004/0002988 A1 * | 1/2004 | Seshadri et al. | ............. | 707/102 |
| 2004/0030620 A1 * | 2/2004 | Benjamin et al. | ............. | 705/32 |

FOREIGN PATENT DOCUMENTS

| | | |
|---|---|---|
| JP | 62-289027 | 12/1987 |
| JP | 3-45053 | 2/1991 |
| JP | 2000-174770 | 6/2000 |
| JP | 2000-253180 | 9/2000 |
| JP | 2000-307660 | 11/2000 |
| JP | 2001-282677 | 10/2001 |
| JP | 2001-320424 | 11/2001 |
| WO | 95/25407 | 9/1995 |

OTHER PUBLICATIONS

Japanese Office Action dated Dec. 14, 2006, with partial translation, from corresponding Japanese Application No. 2002-194612. United Kingdom Office Action in patent application GB0315642.9 dated Jul. 20, 2005.

* cited by examiner

*Primary Examiner* — Alina N. Boutah
(74) *Attorney, Agent, or Firm* — Katten Muchin Rosenman LLP

(57) ABSTRACT

Each of mobile terminals and base stations in a mobile communication system detects the file size of multimedia data from normal command file and calculates the communication costs based on the file size and unit price of the call type, and selects either a packet switched call or a circuit switched call for transmitting the multimedia data file based on the communication costs involved.

13 Claims, 18 Drawing Sheets

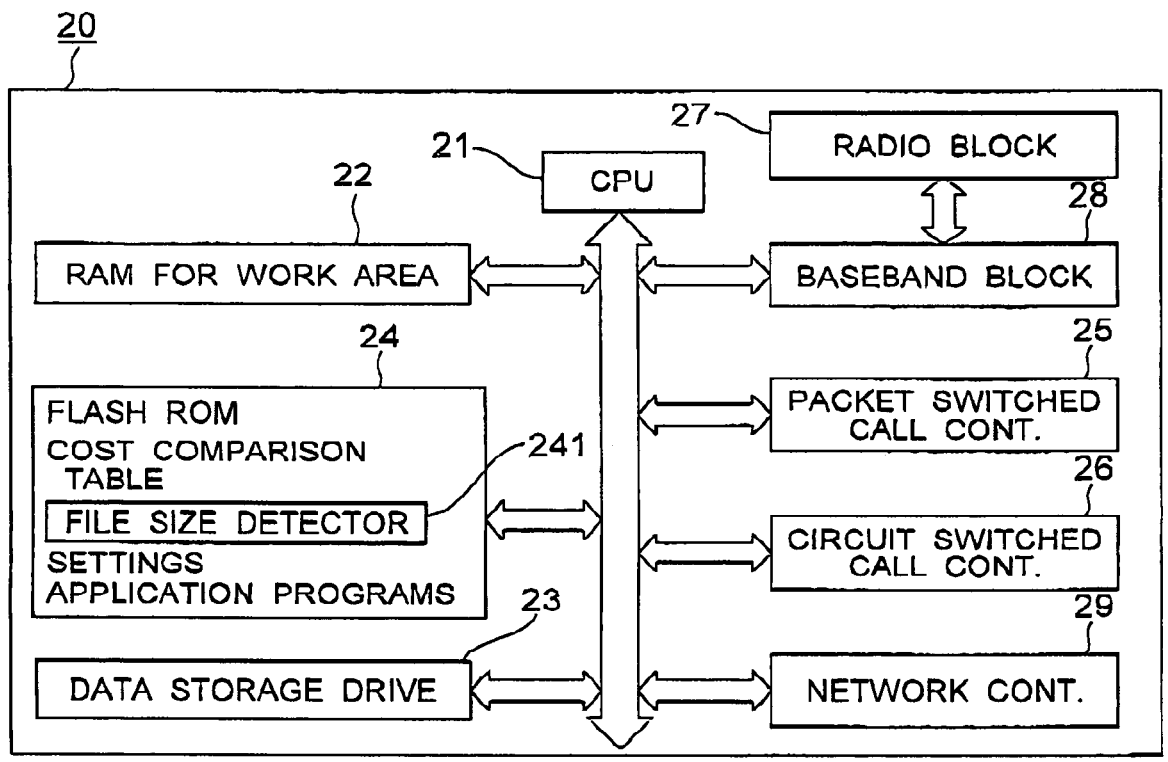

FIG. 5

Normal_cmd s,2002/03/19,hoge.gif,4096,file:///C:/temp/,http://WWW.hoge.com/temp,ftp_id,ftp_pass,
r,2002/03/19,hoge2.gif,,file:///C:/temp/,http://WWW.hoge.com/temp,,,

FIG. 6

Callback_cmd

- CALL TYPE OF CALLBACK
- TRANSFER PASSWORD
- CORRESPONDING COMMAND FILE NAME
- SIZE OF DATA FILE FROM BASE STATION

FIG. 7 cs,callback_pas,normal_cmd3,4096,2048,1024

DATA TRANSFER SYSTEM CAPABLE OF SELECTING A LOW-COST CALL TYPE

BACKGROUND OF THE INVENTION (a) Field of the Invention

The present invention relates to a data transfer system capable of selecting a low-cost call type and, more particularly, to a data transfer system suited to a mobile communication system which transfers data either by a packet switched call or by a circuit switched call.

(b) Description of the Related Art

The number of users accessing the internet by using a mobile terminal, such as a cellular phone, has been remarkably increased in these years. The internet service providers offer a variety of services for e-mail, games, shopping, stock transaction and so on. Among others, the services now attracting the attention of an increasing number of users include those services for allowing e-mails or web sites to transmit or exhibit multimedia data such as including photographs and moving pictures.

The data communications performed by the cellular phone systems generally use packet switched calls. The packet switched call is considerably superior to the circuit switched call so long as only the characters, which generally have a relatively smaller amount of information, are used in the data communication. However, if the transmission data in the mobile communication system include a moving picture having a larger file size, there is a problem in that the packet switching system often involves a larger communication cost compared to the circuit switching system.

In addition, the time length needed for the transmission of a data file has been increased together with the increase of the amount of data in the data file, which raises a problem with respect to the man-machine interface. The increased time length also involves another man-machine interface problem in that the user is restricted for its operation of the mobile terminal during the increased time length for receiving the data file.

In the circumstances as described above, there are some proposals for improving the utilization efficiency of the communication links or reducing the communication cost. Patent Publication JP-A-2000-174770 describes a technique for switching the data paths in a multi-link radio communication network based on the information of the current status of the links monitored, to thereby maintain a constant communication rate irrespective of the current status of the links.

JP-A-2000-253180 describes a technique for automatically selecting one of the links in a network based on the contents to be transmitted, in order to efficiently acquire contents of the information such as multi-media data or text-base data.

JP-A-2000-307660 describes a radio data communication system for improving the utilization efficiency of the communication links by using either the packet switching communication link or the circuit switching communication link. It is described therein that the circuit switching network now used for data transmission is switched to the packet switching network for achieving continued data transmission, if it is difficult to maintain the communication using the circuit switching network or if the amount of data being transmitted by the circuit switching network is reduced.

JP-A-2001-282677 describes a data transfer system which is capable of efficiently using the resources in the system upon transferring to a mobile communication terminal a multi-media data mail including a variety of data such as audio data and/or picture data in addition to the text data. In the described technique, by transmitting transfer assist data to the mobile terminal of the mail destination by using a mail server based on the control data and allowing the multi-media data to include the control data, the mobile terminal can deliver a request of data transfer based on the transfer assist data to prevent, an unnecessary data transmission. This efficiently utilizes the memory resources in the mobile communication terminals without increasing the traffic of the mobile communication network.

JP-A-2001-320424 describes a mobile terminal which is capable of adequately selecting networks based on the types of data to be transmitted/received through the networks. This is achieved by selecting the communication paths suitable to additional data, such as audio data or picture data, based on the additional data acquired by a main data acquisition block and added to the main data, thereby achieving the data transmission at a lower communication cost.

Neither of the conventional techniques as described above, however, teach the concrete technique which enables a mobile terminal in the data transfer system to select by itself a low-cost communication link based on the type of calls while considering a variety of current statuses of the communication links as a whole.

SUMMARY OF THE INVENTION

In view of the above, it is an object of the present invention to provide a data transfer system including a plurality of mobile terminals and a plurality of base stations, which allows the mobile terminal to select by itself a low-cost communication link based on the selection of a call type for the data transmission.

The present invention provides a data transfer system including a plurality of mobile terminals, a plurality of base stations, and a communication network for transmitting data between one of the mobile terminals and a corresponding one of the base stations by using either a packet switched call or a circuit switched call, wherein at least one of the mobile terminals and the base stations includes: a command file storage section for storing therein a first command file including information of a file size of a data file to be transmitted from the own terminal or own station; a command file read section for reading the first command file to detect the file size of the data file; a cost calculation section for calculating a first cost of transmission of the data file by using the packet switched call and a second cost of file transmission of the data file by using the circuit switched call; a cost comparison section for comparing the first cost and the second cost against each other; and a call type selection section for selecting one of the packet switched call and the circuit switched call for transmission of the data file based on a result of comparison by the cost comparison section.

In accordance with the data transfer system of the present invention, at least one of the mobile terminals and the base stations can select a packed switched call or a circuit switched call based on the communication costs involved. Thus, multimedia data including image data or picture data can be transmitted at a lower cost.

The above and other objects, features and advantages of the present invention will be more apparent from the following description, referring to the accompanying drawings.

BRIEF DESCRIPTION OF THE DRAWINGS

FIG. 3 is a block diagram of the base station shown in FIG. 1.

FIG. 4 is a chart showing the contents of the normal command file used in the system.

FIG. 5 is a chart showing the contents of an exemplified normal command file used in the mobile terminal of FIG. 2A.

FIG. 6 is chart showing the contents of a callback command used in the system.

FIG. 7 is a chart showing the contents of data transmitted to the mobile terminal.

PREFERRED EMBODIMENTS OF THE INVENTION

Now, the present invention is more specifically described with reference to accompanying drawings.

Figure 1A:
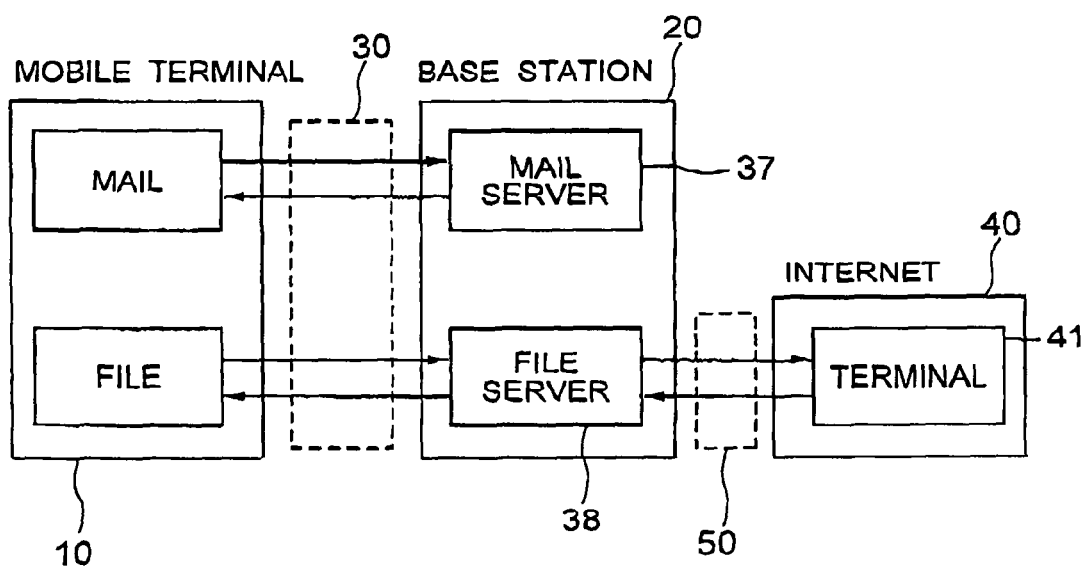
FIG. 1A is a block diagram of a data transfer system according to an embodiment of the present invention.

Referring to FIG. 1A, a data transfer system according to a first embodiment of the present invention includes a plurality of mobile terminals 10 such as cellular phones, a plurality of base stations 20, a hybrid network 30 which includes a circuit switched network and a packet switched network and couples the mobile terminals 10 and respective base stations 20, the internet 40 which includes a plurality of terminals 41 each having a specified address, and a high-speed network 50, such as fiber-to-the-home network, for coupling the base stations 20 to the internet 40. It is assumed here that file transfer is performed between the mobile terminal 10 and the terminal 41 of a designated address via the base station 20 in FIG. 1A.

Figure 1B:
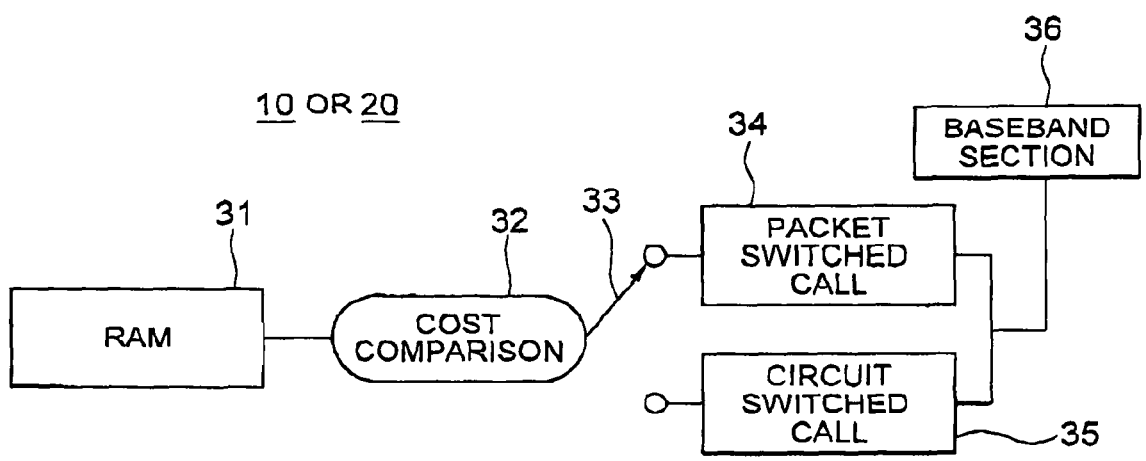
FIG. 1B is a functional block diagram of one of the mobile terminal and the base station shown in FIG. 1A.

Referring to FIG. 1B, each of the mobile terminal 10 and the base station 20 has a mail transmitting/receiving function using a RAM 31, a communication cost comparison block 32 for comparing communication cost between a circuit switched call and a packet switched call, a call selection switch 33 for selecting either a packet switched call or a circuit switched call based on the communication cost, and a packet switched call controller 34 and a packet switched call controller 35 each for delivering a packet switched call or a circuit switched call through a baseband section 36.

Figure 2:
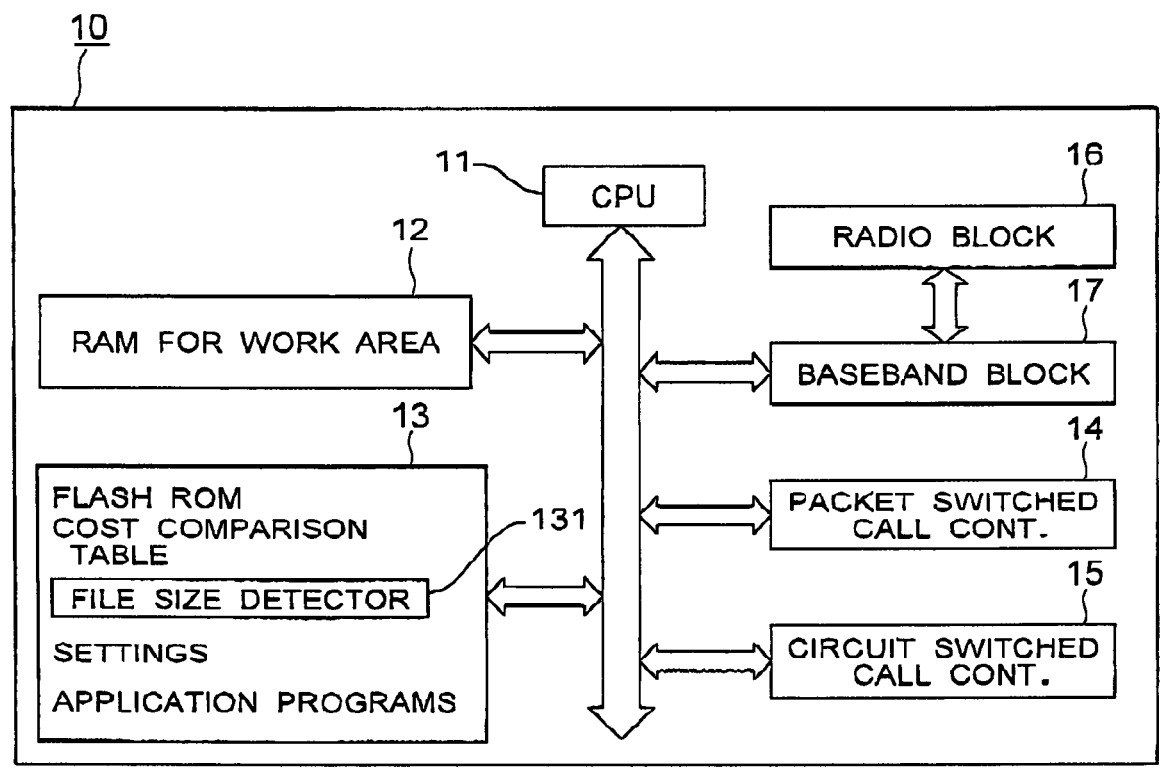
FIG. 2 is a block diagram of the mobile terminal shown in FIG. 1.

Referring to FIG. 2 showing the concrete configuration of the mobile terminal, the mobile terminal 10 includes a system controller (or CPU) 11 for controlling the overall operation of the mobile terminal 10, a RAM 12 used as a work area, a flash ROM 13 for storing therein control programs, application programs such as including a browser, a communication cost table and a variety of settings, packet switched call controller 14 (34 in FIG. 1A) and circuit switched call controller 15 (35 in FIG. 1A) both disposed at the ends of the bearer channels for converting the data format of the transmission file, a file size detector 131 built in the flash ROM 13 for detecting the file size of the transmission file, a radio block 16 for receiving/transmitting data, and a baseband block 17 for controlling the radio block 16.

Although the packet switched call controller 14, circuit switched call controller 15 and file size detector 131 may be configured by programs, these sections 14, 15 and 131, especially sections 14 and 15, should be implemented by hardware. In addition, the mobile terminal 10 should preferably include a data storage drive for storing a variety of data.

It is also preferable that both the communications using a packet switching call and a circuit switching call be performed concurrently to raise the convenience for the user.

Referring to FIG. 3, the base station 20 includes a system controller (or CPU) 21 for controlling the overall operation of the base station 20, a RAM 22 used as a working area, a data storage drive 23 for storing therein a large amount of data including mails and files, a flash ROM 24 for storing therein control programs, applications, a communication cost table and user data, and packet switched call controller 25 and circuit switched call controller 26 both disposed at the ends of the bearer channels for converting the data format of the transmission file, a file size detector 241 built in the flash ROM 24 for detecting the file size of the transmission file, a radio block 27 for receiving/transmitting data, a baseband block 28 for controlling the radio block 27, and a network controller 29 for connecting the base station 20 to an external network such as the internet 40 shown in FIG. 1A.

The base station 20 also includes a mail server (37 in FIG. 1A) for controlling and processing the mails delivered from a plurality of mobile terminals 10 at a time, and a file server (38 in FIG. 1A) for controlling file transfer from the plurality of mobile terminals 10 at a time and temporarily storing the file for the file transfer.

It is to be noted that command files for controlling the successive transfer of data files are needed in the present embodiment. The command files include a first type used for transferring the data file, prepared by the mobile terminal 10, from the mobile terminal 10 to the base station 20, and a second type used for transferring the data file from the base station 20 to the mobile terminal 10. The first type may be exceptionally used for transmitting the data file from the base station 20 to the mobile terminal 10 when the mobile terminal 10 is browsing.

More specifically, the first type is used for transmitting/receiving ordinary files, whereas the second type is used for the base station 20 to request the mobile terminal 10 of a callback or for the base station 20 to notify the mobile terminal 10 of the size of the file which the mobile terminal 10 is now to receive.

The first type is herein referred to as normal command "Normal_cmd" whereas the second type is referred to as a callback command "Callback_cmd" for the convenience of description. The callback command also includes a first second-type that requests the mobile terminal 10 of a callback itself and is herein referred to as first callback command "Callback_cmd1", and a second second-type that notifies the mobile terminal 10 of the file size and is herein referred to as second callback command "Callback_cmd2".

Referring to FIG. 4, the command file "Normal_cmd" includes information of transmission/receipt, date and time of transmission/receipt, file name to be transmitted/received, file size, addresses of the mobile terminals, address of the network side, address in the file server (in the case of the file from the base station), FTP (file transfer protocol prescribed in RFC959) ID and FTP password.

The command file "Normal_cmd" is a text file, which is prepared by directly editing a text file by using a text editor. This command file may be prepared or added for the information by using the cache memory of the mobile terminal in an off-line mode, or by selecting a received file during a browsing operation in an on-line mode.

Upon transmission/receipt of a data file, the communication costs are compared based on the file size data described in the command file "Normal_cmd". There may be a case wherein the file size is not known for the received file in the base station, and in such a case, the file size is entered by the mobile terminal upon receipt of command file "Callback_cmd" from the base station with the column for the file size being blank in the base station. In addition, if a data file is to be transmitted from the base station to the mobile terminal in the present embodiment, only the data file attached by a file size data is actually transferred therefrom, while stopping the transfer of the data file attached by no file size data.

The addresses of the originating terminal and the destination terminal are entered in the address columns. It is noted however that the base station adds the "address within the file server" upon receipt of the command file "Normal_cmd" from the mobile terminal. Upon preparing the command file "Normal_cmd" during the browsing operation, the base station describes the addresses from the first.

FTP ID and FTP password are needed upon using the FTP. If the FTP is to be used with these columns being blank, the base station enters "ID:guest" and "Password:anonymous" for the FTP mail server. If the FTP is not used or if guest ID is to be used, these columns may be blank.

In the present embodiment, the command file "Normal_cmd" is stored in both the mobile terminal and the base station, and if the file transfer is successful or if the file transfer between the file server and the designated address is unsuccessful, then information of the file is deleted. Overwrite of the command file is prohibited except for operation by the user, and the command file is managed by affixing thereto a sequential serial number. In addition, deletion or merge of the command file "Normal_cmd" is possible by using a merge operation.

Referring to FIG. 5, an exemplified command file "Normal_cmd" on the mobile terminal side includes notification of file transmission (s) in the first row which specifies the file size, FTP ID and FTP password, and notification of file receipt (r) in the second row which does not include information of file size and the items of FTP in this example.

Referring to FIG. 6, the command file "Callback_cmd" generally includes descriptions of file information shown therein for each of the files, the file information including the call type of the callback, a transfer password, a corresponding command file name, the size of file transferred from the base station to the mobile terminal and so on.

Upon the callback, the mobile terminal operates for transmission based on the call type of the callback described in the command file shown in FIG. 6. The transfer password is transmitted for each call when the mobile terminal is requested by the base station to perform a callback, and is used for verification between the mobile terminal and the base station upon the callback. This password corresponds to the command file stored in the base station in one-to-one correspondence, and thus allows the base station to identify the command file to be executed.

The descriptions of the file size include an array of file sizes, which include only the sizes of files to be transmitted by the base station. For example, if files having 300 bytes, 400 bytes and 500 bytes are to be transmitted, the descriptions simply include 300, 400 and 500. The mobile terminal obtains the file sizes from this information, thereby updating the command file "Normal_cmd".

This command file is deleted after the verification, and the control of the subsequent file transfer is shifted to the control by another normal command file "Normal_cmd" recited in this command file. It is to be noted however that the file transfer from the mobile terminal to the base station is not conducted in the case of startup of the command file "Normal_cmd based on the command file "Callback_cmd.

The command file "Callbck_cmd2 is basically similar to the command file "Callback_cmd1" except that the columns for the call type of the callback and the transfer password are blank in "Callback_cmd2" because these data are unnecessary therein.

Referring to FIG. 7, descriptions of the exemplified command file "Callback_cmd1" include a request of re-transmission by using a circuit switched call, wherein it is described that the sizes of the three files set in "Normal_cmd3" are notified and that these three files are to be transmitted. In addition, it is shown therein that the identification password is "callback_pas".

Roughly categorizing the processings in the system of the present embodiment, there are four cases of processings, including a first case of transmission from the mobile terminal, a second case of callback processing, a third case of transmission from the mobile terminal during a browsing processing, and a fourth case of transmission from the base station. The operations of the mobile terminals and the base stations in these four cases will be described hereinafter with reference to flowcharts. It is to be noted that the operation of the mobile terminal operating for an ordinary receiving processing will be omitted in the case of transmission from the base station to the mobile terminal because only the base station transmits a mail in this case. In addition, an operation similar the operation that is already described in detail will be omitted for the detailed description.

Figure 8:
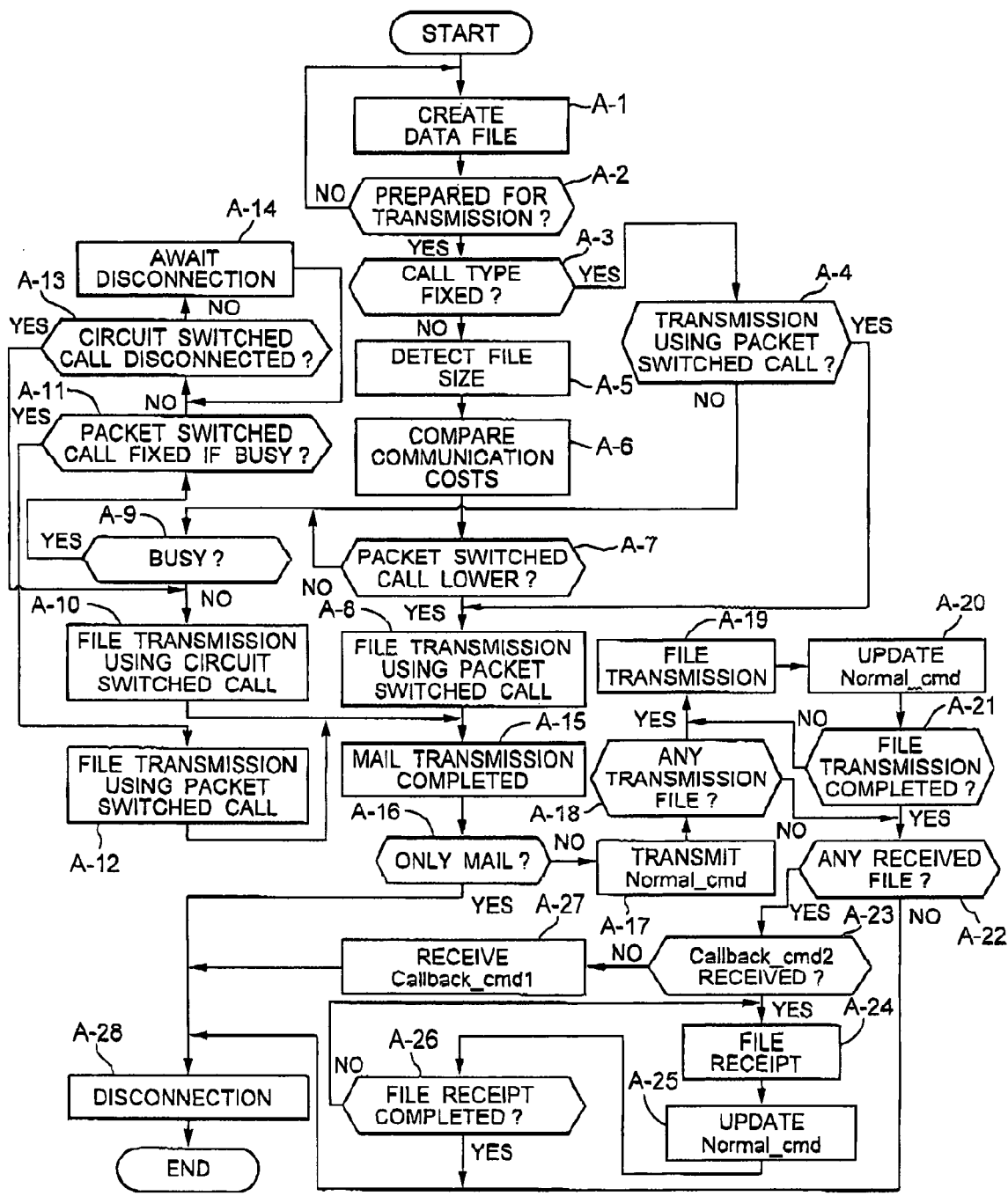
FIG. 8 is a flowchart of the procedure of data transmission by the mobile terminal.

Referring to FIG. 8, there is shown a flowchart of a transmission procedure by the mobile terminal. The transmission procedure will be described herein in five groups of processing.

[1] Preparation of Data File; Steps A-1 to A-2

The user first creates a mail or "Normal_cmd" to be transmitted to prepare the data for transmission. If there are plurality of transmission data, the transmission data may be transmitted one by one, or may be transmitted in a bulk in the case of mails. If the transmission data from the mobile terminal includes a plurality of data files instead, a command file "Normal_cmd" that prescribes a successive transmission processing may be created in the mobile terminal for transmission of these data files in a bulk.

[2] Selection of Call Type: Steps A-3 and A-4

After the transmission data are prepared, call type for the transmission is selected before transmission of the data. The file size is detected if an automated selection of the call type of the transmission call is desired. On the other hand, the file size is not detected if the call type of the transmission call is specified, i.e., if either a packet switched call or a circuit switched call is specified whereby transmission processing is started based on the specified call type. These settings are determined by the user, and if these settings are changed by the user, the decision or change of the settings is notified to the base station. In addition, if a data transmission is selected, with the automated selection of the call type being set, and yet there is no transmission data, a packet switched call is selected for the transmission because an access by using a browser is expected in this case.

[3] Comparison of Communication Cost: Steps A5 to A6

A packet switched call and a circuit switched call are subjected to calculation of communication costs and compared against one another with respect to the communication cost (step A6) by using the total file size detected by a file size detection step of A5 and a communication cost comparison table, thereby selecting the call type which achieves a lower cost. If the file size is not known in step A6 for the case of "Normal_cmd" including description of a receipt command, calculation of cost is performed with the file size being assumed zero byte. The communication cost comparison table includes a unit price of a packet and a unit price of a circuit switched call per unit time, which are notified by the base station upon startup of the mobile terminal or upon transmission, as well as a data communication rate of the circuit switched call. The communication cost comparison table is updated upon a change of data recorded.

[4] Transmission Processing: Steps A-7 to A-14

A data transmission is performed based on the selected call type determined heretofore. If a packet switched call is selected, the transmission is performed immediately using the selected call type. If a circuit switched call is selected, it is examined whether or not there is an existing call for avoiding competition with the existing voice call. If there is an existing call and the setting of competition is such that a packet switched call is selected upon an existing call, a packet switched call is selected based on the setting. This setting can be determined by the user, and if the setting is changed by the user, the change of the setting is notified from the mobile terminal. On the other hand, if there is an existing call and the setting of competition is such that a circuit switching call is selected upon an existing call, a polling operation is performed until the existing call is ended to detect the end of the existing call. Thus, a data transmission using a circuit switched call is started after the detecting the end of existing call.

[5] File Transmission/Receipt and Disconnection: Steps A-15 to A-18

A higher-order application program such as mail software or browser is then used for the file transmission. If another file for transmission or receipt exists after the file transmission, the another file is transmitted/received by using transmission of the command file "Normal_cmd", whereas if such a file is not present, the link is disconnected. This transmission of a file is performed between the mobile terminal and the file server of the base station.

When transmission of a file is completed, the receiving side notifies the transmitting side of the completion of the transmission, and deletes or updates the information of a corresponding file in the command file "Normal_cmd". The transmitting side also deletes or updates the information of a corresponding file in the command file "Normal_cmd" upon receipt of the notification of the completion. On the other hand, if the file is not received safely, the receiving side notifies the transmitting side of a request for re-transmission of the file. If the base station then delivers "Callback_cmd2", the mobile terminal continues operation for receipt of the file, whereas if the base station delivers "Callback_cmd1", the mobile terminal disconnects the link.

Figure 9:
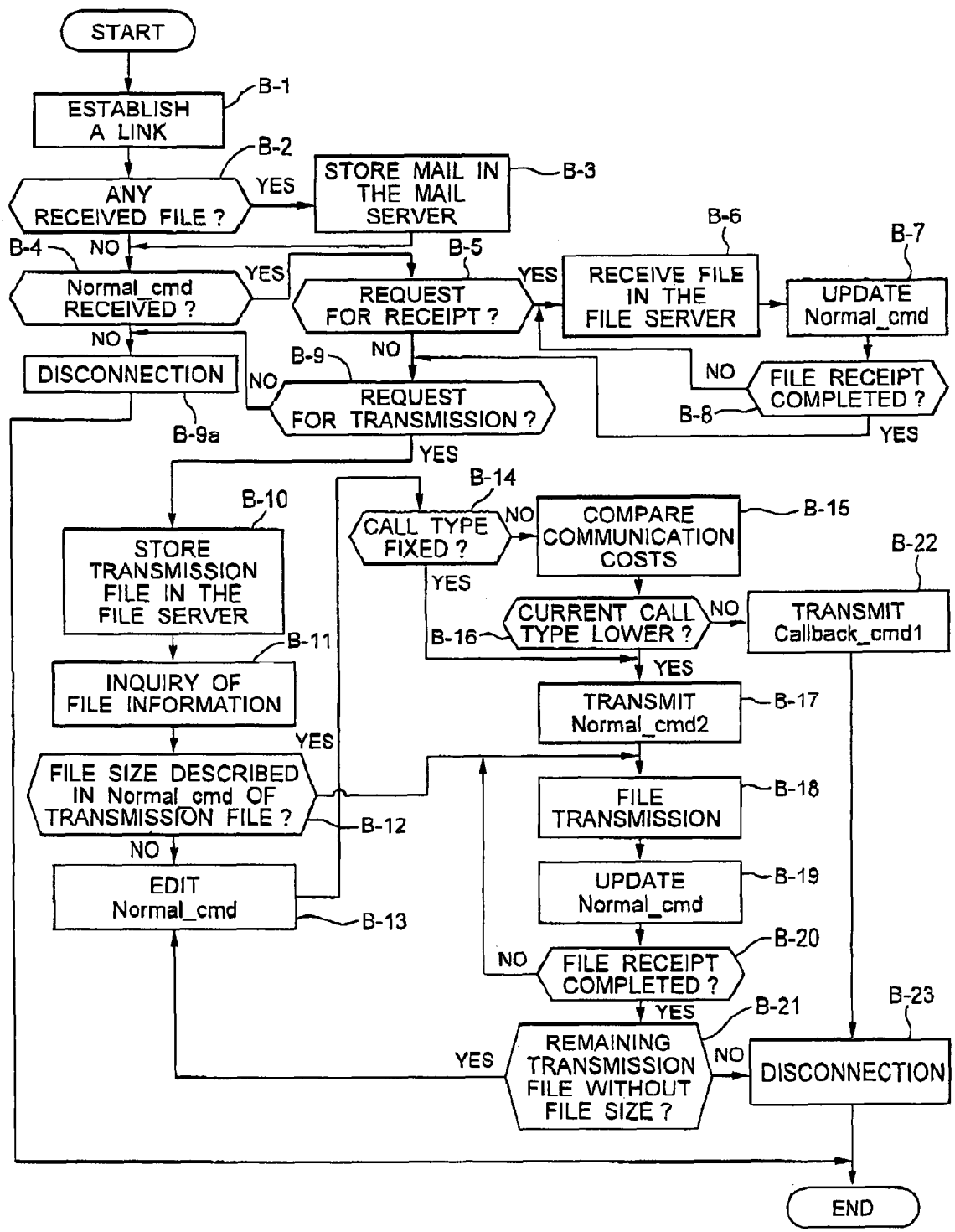
FIG. 9 is a flowchart of the procedure by the base station during data transmission from the mobile terminal.

Referring to FIG. 9, there is shown a procedure of the base station side in the case of transmission from the mobile terminal to the base station. The procedure in this case will be described in two stages of the procedure.

[1] File Receipt: Steps-B-1 to B-8

After the transmission link is established, the base station examines whether or not the data delivered from the mobile terminal includes a mail, and registers the mail, if any, in the mail server. The base station awaits receipt of the command file "Normal_cmd" after the receipt of the mail, wherein the base station judges that only a mail transmitted if there is no "Normal_cmd", and operates for disconnection of the link after the mobile terminal requests the disconnection.

Upon receipt of the command file "Normal_cmd", the base station analyzes the command file to confirm whether or not there is a file to receive. If a file to receive is specified, the base station allows the file server to receive the file. The file transferred into the file server is deleted after the file is successfully transferred to a designated address, whereas the base station stores the file in the file server for a specified time length if the file transfer to the designated address is failed. After the file stored in the file server is successfully transferred to the designated address, the information in "Normal_cmd" as to the file is recorded in the file server, whereas the portion of descriptions in "Normal_cmd" as to the file is deleted.

[2] File Transmission: Steps B-9 to B-23

If "Normal_cmd" includes a command that the base station transmit a file, the base station retrieves the specified file, receives and stores the same in the file server, and delivers an inquiry as to the file size (steps B-10 to B-11). By using the file server for transmission/receipt of the file, an overhead problem can be prevented which may be encountered in the routing etc.

After completing the data transfer from the specified address in the internet to the file server, the base station analyzes the command file "Normal_cmd" to examine whether or not the size of file to be transmitted to the mobile terminal is described therein (step B-12). If the file size is described, the base station transmits the file before editing "Normal_cmd" in consideration that the current call type is selected in the transmission while considering receipt of the file (step B-18). Thereafter, if there is a remaining description for file transmission in "Normal_cmd", the base station transmits the file after editing "Normal_cmd".

The base station then analyzes information as to the call type selection of the originating call notified by the mobile terminal (step B-14). If the call type is fixed, the base station transmits the file from the file server based on the contents of descriptions in Normal_cmd (B-18), followed by disconnection of link (B-23). On the other hand, if the call type is not fixed, the base station compares the communication costs (step B-15), and transmits the file by using the current call type so long as the base station judges that the current call type affords a lower cost (step B-18). If the current call type does not affords a lower cost, the base station transmits Callback_cmd1 to the mobile terminal (B-22), and disconnects the link after the base station receives a disconnection request from the mobile terminal (step B-23).

Figure 10:
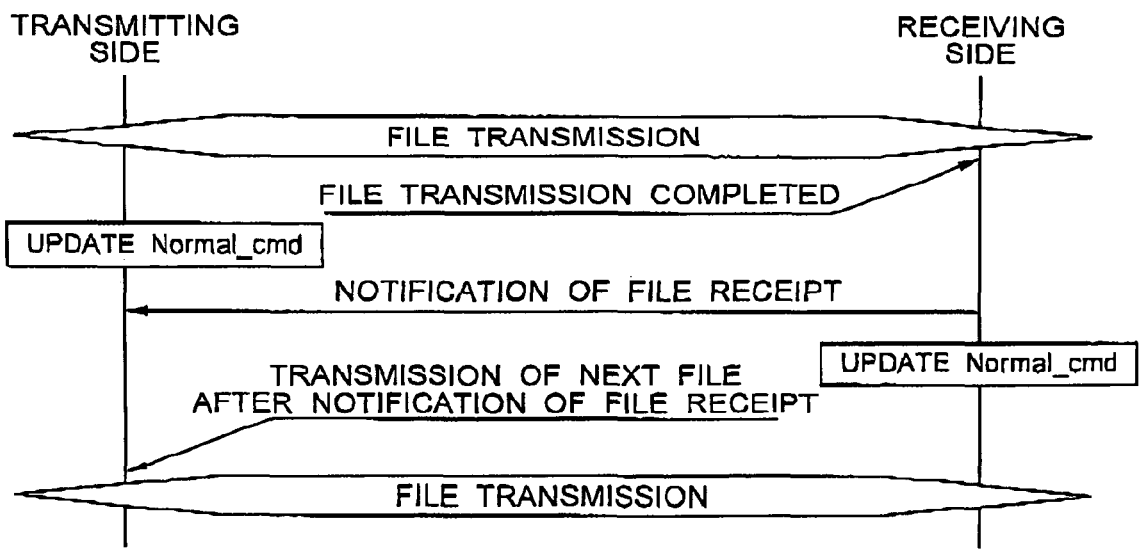
FIG. 10 is flowchart of the procedure of file transmission between the base station and the mobile terminal in the case of a successful re-transmission of the file.
Figure 11:
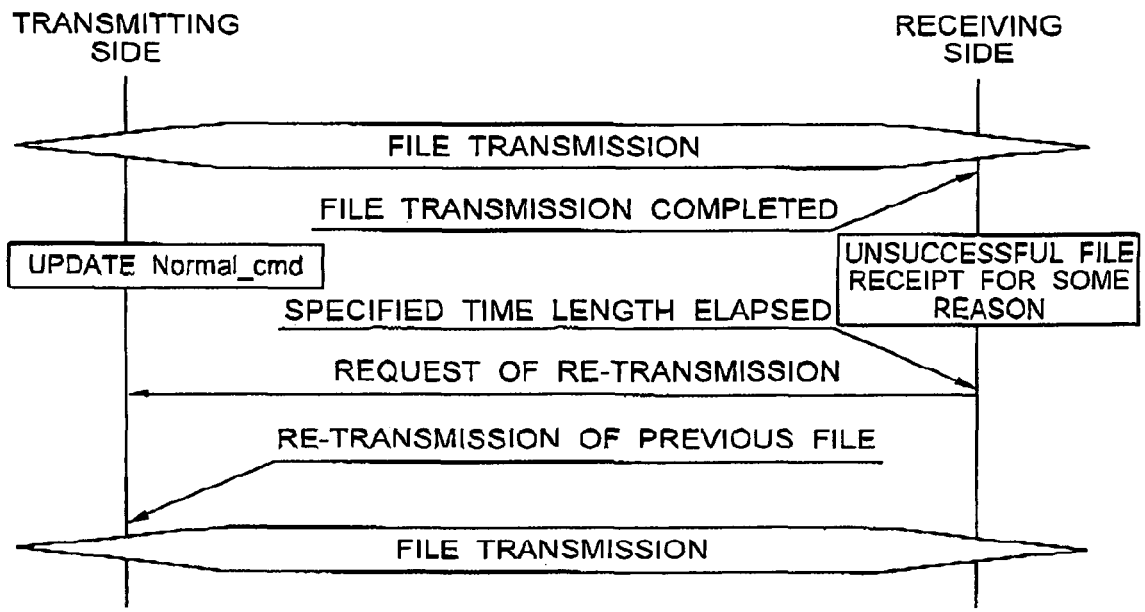
FIG. 11 is a flowchart of the procedure of file transmission between the base station and the mobile terminal in the case of an unsuccessful re-transmission of the file.

Referring to FIGS. 10 and 11, there are shown procedures of file transfer between the base station and the mobile terminal in the case of a successful re-transmission and an unsuccessful re-transmission, respectively.

If Normal_cmd includes description of a command that base station transmit a specified file, the base station retrieves the specified file, receives and stores the specified file in the file server, and inquires information of the file size. By using the file server in the file transmission/receipt, an overhead problem can be prevented which may be involved in the routing etc.

The base station analyzes the information of selection of the call type for the originating call notified by the mobile terminal. If the call type is fixed, the base station operates for file transmission from the file server based on the contents of description in Normal_cmd, and disconnects the link after the transmission. On the other hand, if the call type is not fixed, the base station compares the communication costs, and transmits the file by using the current call type so long as it judges that the current call type affords a lower cost, whereas the base station transmits Callback_cmd1 to the mobile terminal and disconnects the link after receiving a disconnection request from the mobile terminal if it judges that the current call type does not afford a lower cost.

Figure 12:
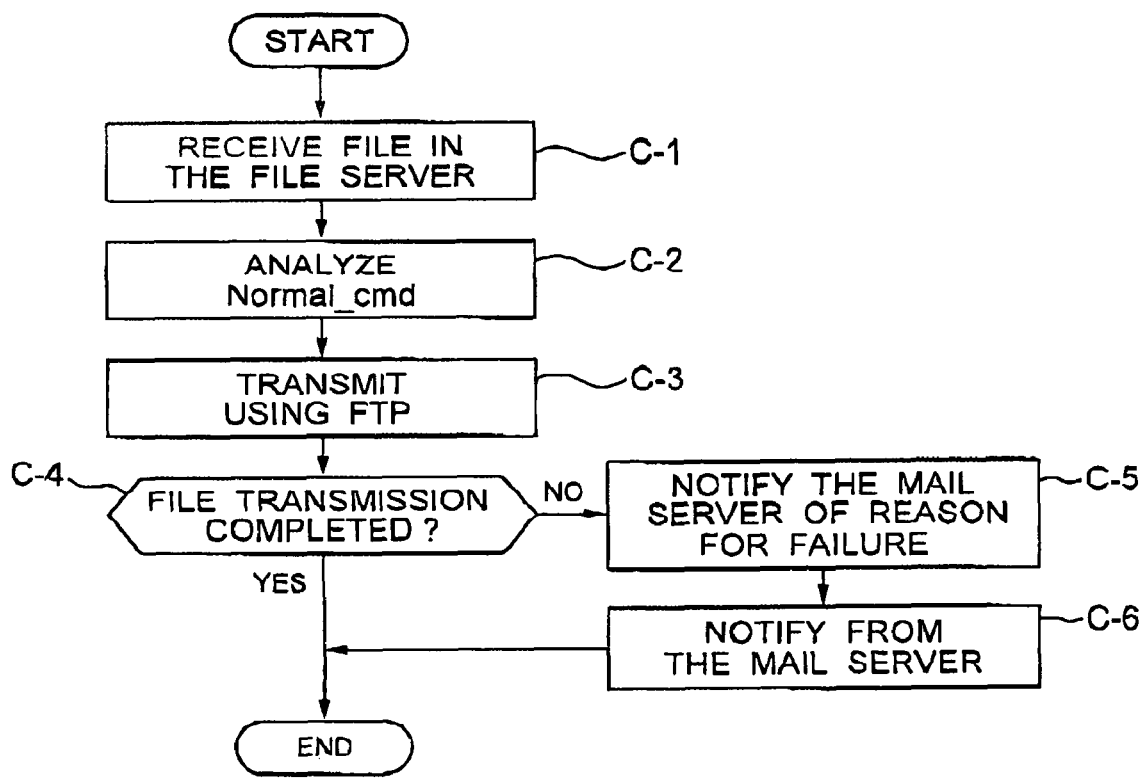
FIG. 12 is a flowchart of the procedures of file transmission from the base station to the designated address and of notification to the user of the unsuccessful file transfer.
Figure 13:
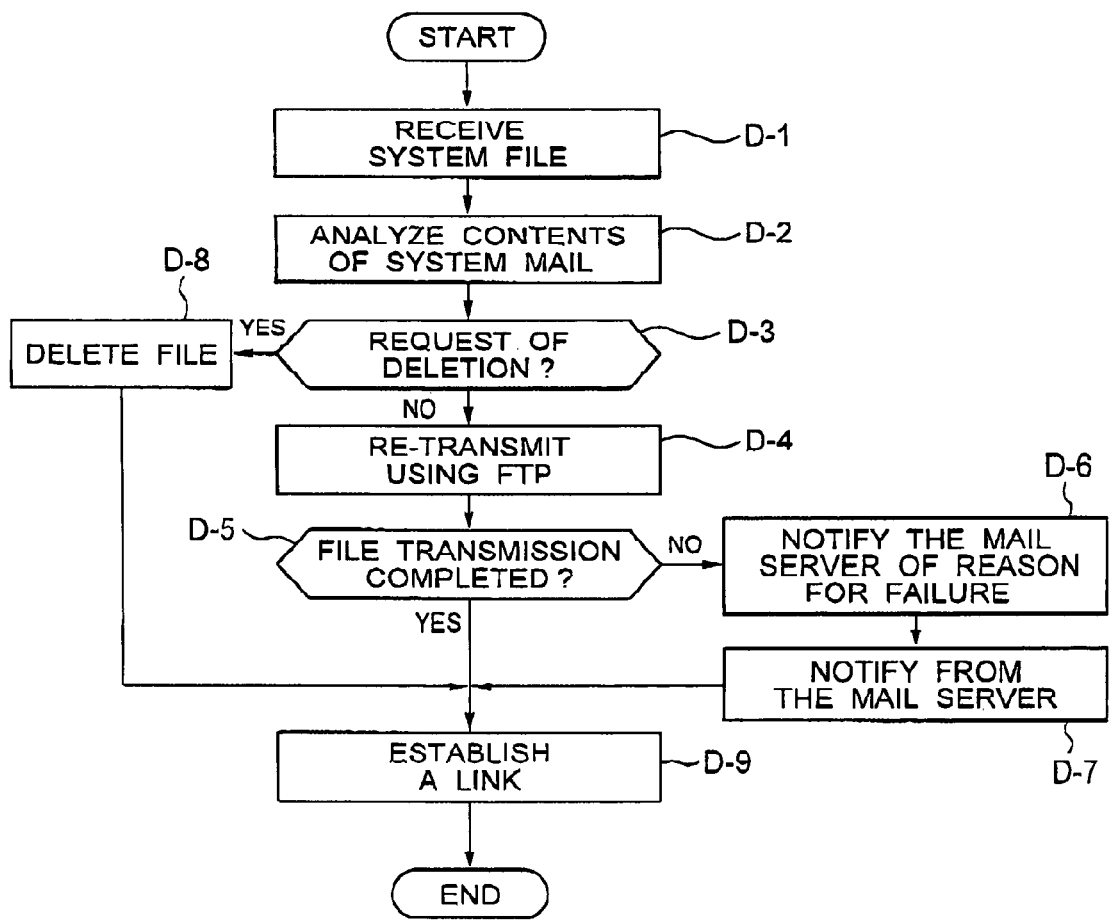
FIG. 13 is a flowchart of the procedure of mail receipt performed after the unsuccessful file transfer from the base station to the designated address.
Figure 14:
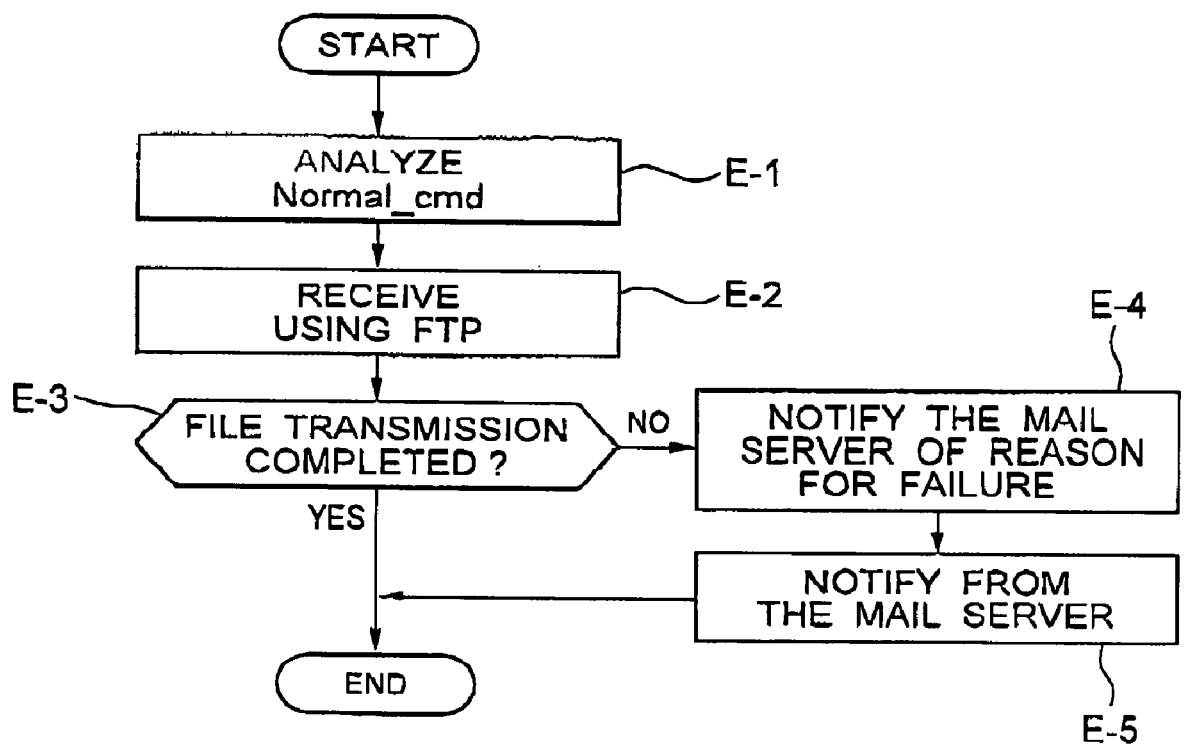
FIG. 14 is a flowchart of the procedures of notification to the user of the file transfer from the designated address to the base station and of the unsuccessful file transfer.
Figure 15:
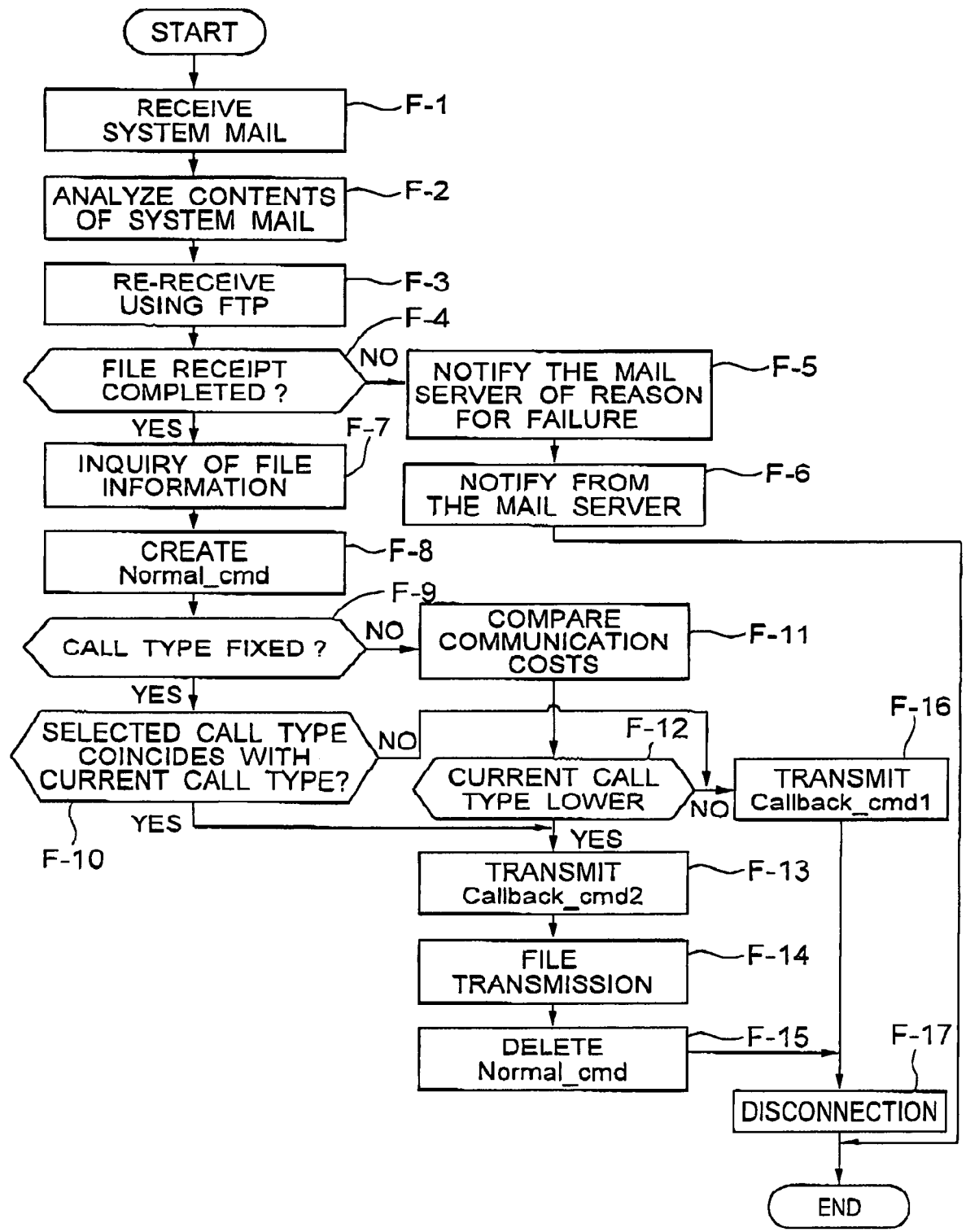
FIG. 15 is a flowchart of the procedure performed in the case of receipt of a mail notifying re-transmission after unsuccessful receipt of a file from the designated address.

FIGS. 12 to 15 are flowcharts each showing a file transfer between the designated address and the base station. FIG. 12 shows the procedure of file transmission from the file server to the designated address, FIG. 13 shows the procedure upon receipt of a mail requesting re-transmission after a failed transfer from the base station to the designated address, FIG. 14 shows the procedure of file transmission from the designated address to the base station, and FIG. 15 shows the procedure upon receipt of a mail requesting re-transmission after a failed transfer from the designated address to the base station.

In FIG. 12, upon a file transmission from the mobile terminal to the base station while designating an address (step C-1), the file server analyzes the information in Normal_cmd (step C-2), and attempts a FTP transmission to the designated address (step C-3). This FTP transmission is performed for each of transmitted files as a separate task separately from the task of file communication between the mobile terminal and the base station, whereby the file communication between them is not affected by the FTP transmission. If the file transmission is failed due to some reason such as a wrong FTP password, the reason of the failure is notified to the user by mail (steps C-5 to C-6). The failed file is stored for a specified time length The user responds to the notifying mail by inputting the address, FTP ID, FTP password etc. thereof, to request re-transmission of the file, or may delete the request of the file transmission itself. The user may prepare another Normal_cmd or add/edit descriptions in the current Normal_cmd based on the notifying mail, thereby transmitting a system mail to the base station.

In FIG. 13 showing the subsequent procedure, upon receipt of the system mail from the user responding to the notifying mail (step D-1), the base station analyzes the contents of Normal_cmd in the system mail (step D-2). If Normal_cmd includes descriptions requesting deletion of the file (step D-3), the file stored in the file sever is discarded (step D-8), followed by establishment of the transmission link between the base station and the mobile terminal (step D-9). On the other hand, if Normal_cmd requests re-transmission of the file, the base station operates for re-transmission of the file stored in the file server (step D-4). If it is judged that the re-transmission is successful (step D-5), a link for receiving another file is established. If it is judged in step D-5 that the file re-transmission is unsuccessful, the reason for the failed re-transmission is notified to the user via the mail server (steps D-6 and D-7).

In FIG. 14, upon request of file transmission from the designated address to the mobile terminal, the file server analyzes information from Normal_cmd (step E-1), and attempts receipt of the file from the designated address (step E-2). If the file transmission from the designated address in the internet to the file server in the base station is failed for some reason such as a wrong FTP password (step E-3), the reason for the failed file transmission is notified to the user via the mail server (steps E-4 and E-5). The user responds to the notifying mail by inputting the address, FTP ID, FTP password etc. thereof, to request re-receipt of the file. The user may prepare another Normal_cmd or add/edit descriptions in the current Normal_cmd based on the notifying mail, thereby transmitting a system mail to the base station.

In FIG. 15 showing the case of a request for re-receipt of the file, the mobile terminal delivers a system mail to the base station and prepares Normal_cmd corresponding to the system file. Upon receipt of the system mail (step F-1), the base station analyzes the contents of the mail (step F-2) and attempts receipt of the file by using a FTP transmission from the designated address (step F-3). If the receipt of file is successful, the base station delivers an inquiry as to information of the file, and operates for a normal transmission procedure (steps F-4 to F-10). It is to be noted that the command file "Normal_cmd" is deleted (not updated) because Normal_cmd includes only one file registered.

If the file transfer from the designated address in the internet to the file server in the base station is unsuccessful (step F-4), the base station notifies in real time the mobile terminal of the unsuccessful transfer in addition to a notifying mail. The mobile terminal deletes the description corresponding to this file transfer upon receipt of the real time notification, whereas the base station deletes the description corresponding to this file transfer upon the failure of re-transmission of the file. After receiving the notification and transmission of the necessary information, the mobile terminal indicates the unsuccessful file transmission on the LCD unit thereof to notify the user.

Figure 16:
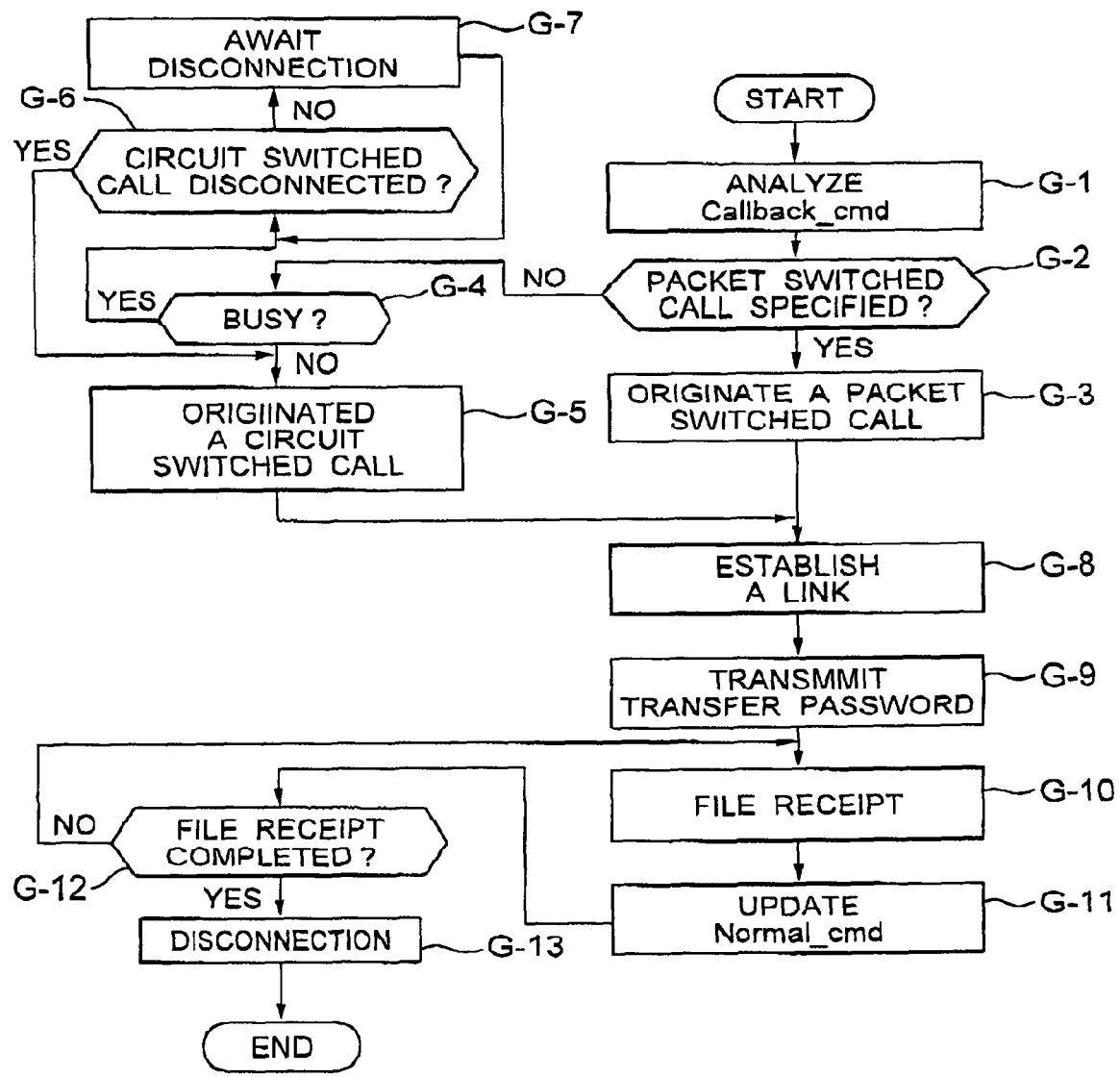
FIG. 16 is a flowchart of procedure of callback transmission by the mobile terminal.

Referring to FIG. 16 showing the procedure of callback processing in the mobile terminal, the mobile terminal analyzes the call type of the callback specified in Normal_cmd1 received from the base station transmitting a callback notification (step G-1). The mobile terminal uses a packet switched call in the callback (step G-3) if the packet switched call is specified in Callback_cmd1 (step G-2), whereas the mobile terminal judges whether or not the mobile terminal is busy for a voice call (step G-4) if it is judged in step G-3 that a circuit switched call is specified. If the mobile terminal is not busy, the mobile terminal transmits a callback (step G-5). If the mobile terminal is busy, the mobile terminal waits the end of call (step G-7) while detecting the end of call by using a polling operation (step G-6). After establishing a transmission link (step G-8), the mobile terminal transmits a transfer password (G-9), and receives the file based on the contents ill Normal_cmd1 after the verification by the base station (step G-10). If there is no remaining file to be received (step G-12), the link is disconnected (step G-13).

Figure 17:
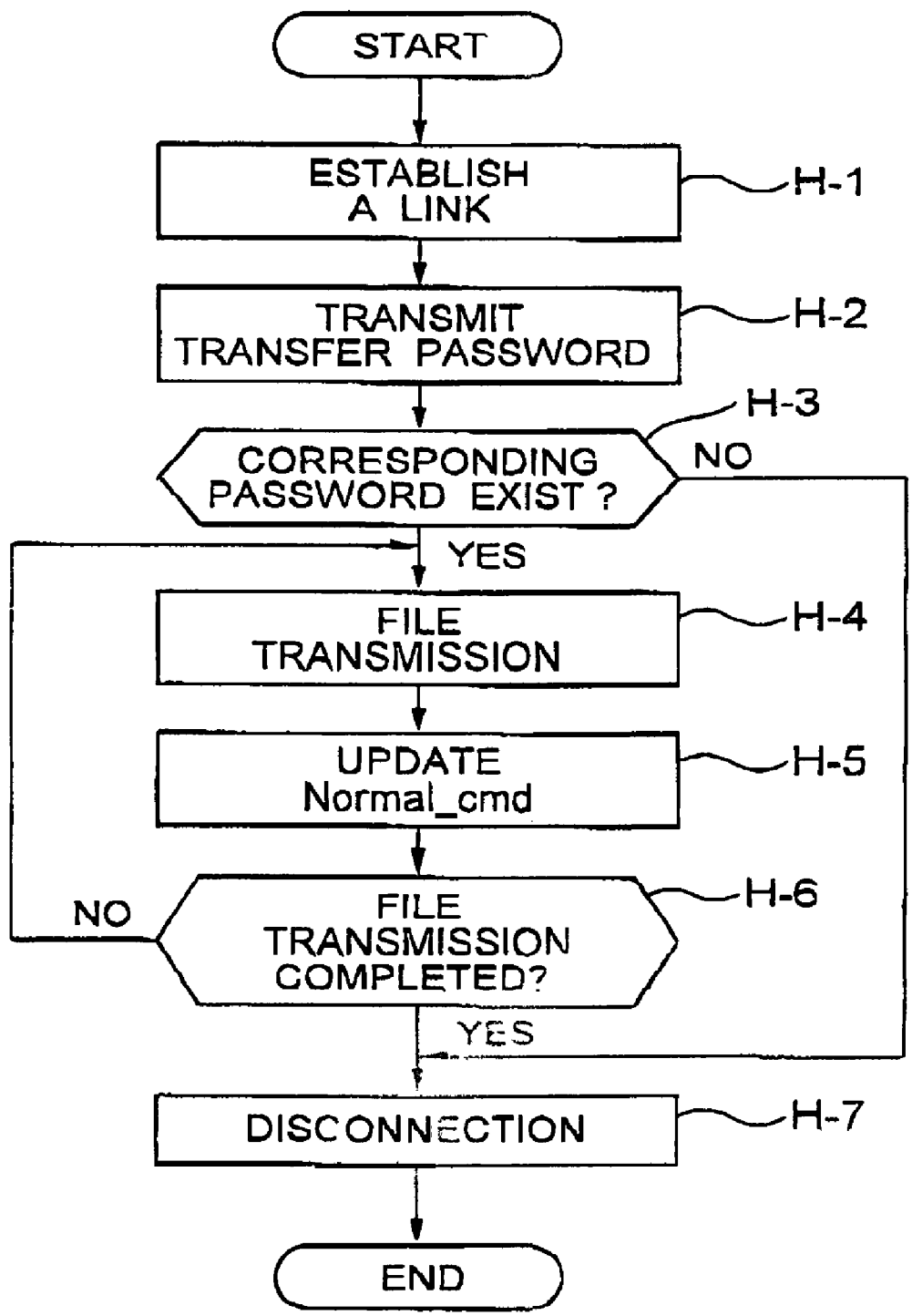
FIG. 17 is a flowchart of the procedure of callback reception by the base station.

Referring to FIG. 17, there is shown the procedure by the base station during receipt of a callback. After establishment of a link (step H-1), the base station operates for verification of the user based on the transfer password thereof (steps H-2 and H-3). If there is a corresponding password, the base station starts for file transmission while using Normal_cmd corresponding to the password (step H-4). If the file is successfully transmitted, the base station updates Normal_cmd (step H-5). After it is confirmed that all the files are transmitted, the base station disconnects the link upon receipt of a disconnection request from the mobile terminal (steps H-6 and H-7).

Figure 18:
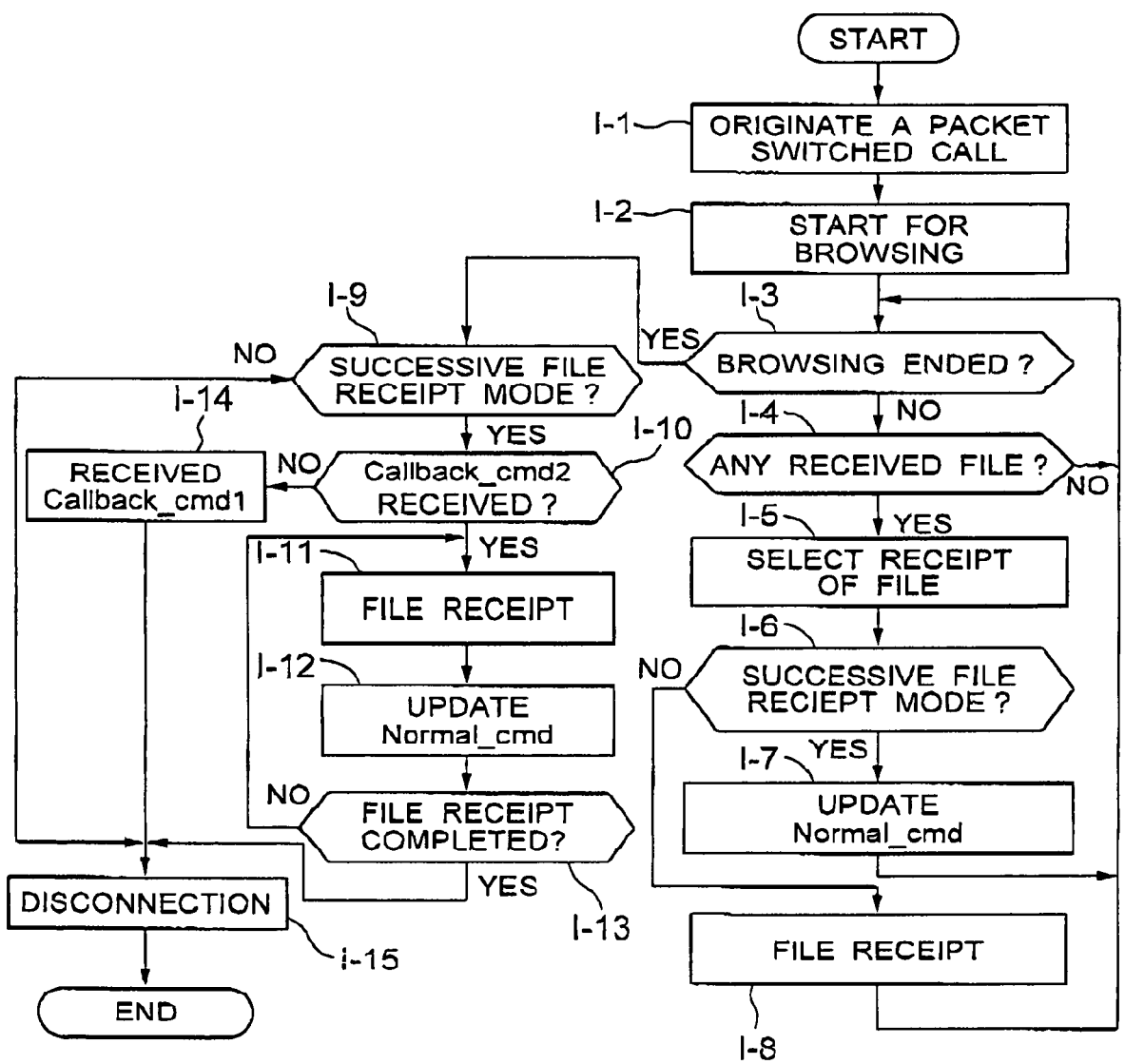
FIG. 18 is a flowchart of the procedure of file receipt by the mobile terminal during the browsing operation.

Referring to FIG. 18, there is shown the procedure of file receipt by the mobile terminal during a browsing operation. This procedure will be described in three different groups.

[1] Perform Browsing Operation: Steps I1 to I3

For starting a browsing operation, the mobile terminal transmits a request by using a packet switched call (steps I1 and I2), because the time length needed for data transmission and the contents of data are not generally fixed in the browsing operation The mobile terminal may select beforehand a mode of allowing successive file receipt or a mode of not allowing successive file receipt. The information of the mode selection or change of the mode is notified from the mobile terminal to the base station.

[2] Selection of File Receipt During Browsing Operation: Steps I-4 to I-8

If a file or files are received in the mobile terminal during the browsing operation, the mobile terminal may specify selection of the received file or files (steps I-3 to I-5). If the successive file receipt mode is selected, the mobile terminal edits only the Normal_cmd and continues the browsing operation (steps I-6 and I-7). If the successive receipt mode is not selected, the mobile terminal operates for processing of receipt of the file, and then returns to the browsing operation after the file receipt (steps I-6 and I-8).

[3] Selection of File Receipt after Browsing Operation: Steps I-9 to I-15

After the browsing operation is finished, the transmission link is disconnected if the successive file receipt mode is not selected, whereas the mobile terminal shifts to a successive file receipt processing if the successive file receipt mode is selected.

If the mobile terminal receives Callback_cmd2 and then a file is transmitted, the mobile terminal immediately operates for a successive file receipt processing, and disconnects the link after all the files are received (steps I-9 to I-13). On the other hand, if the mobile terminal receives Callback_cmd1, the mobile terminal immediately disconnects the link (steps I-14 and I-15).

Figure 19:
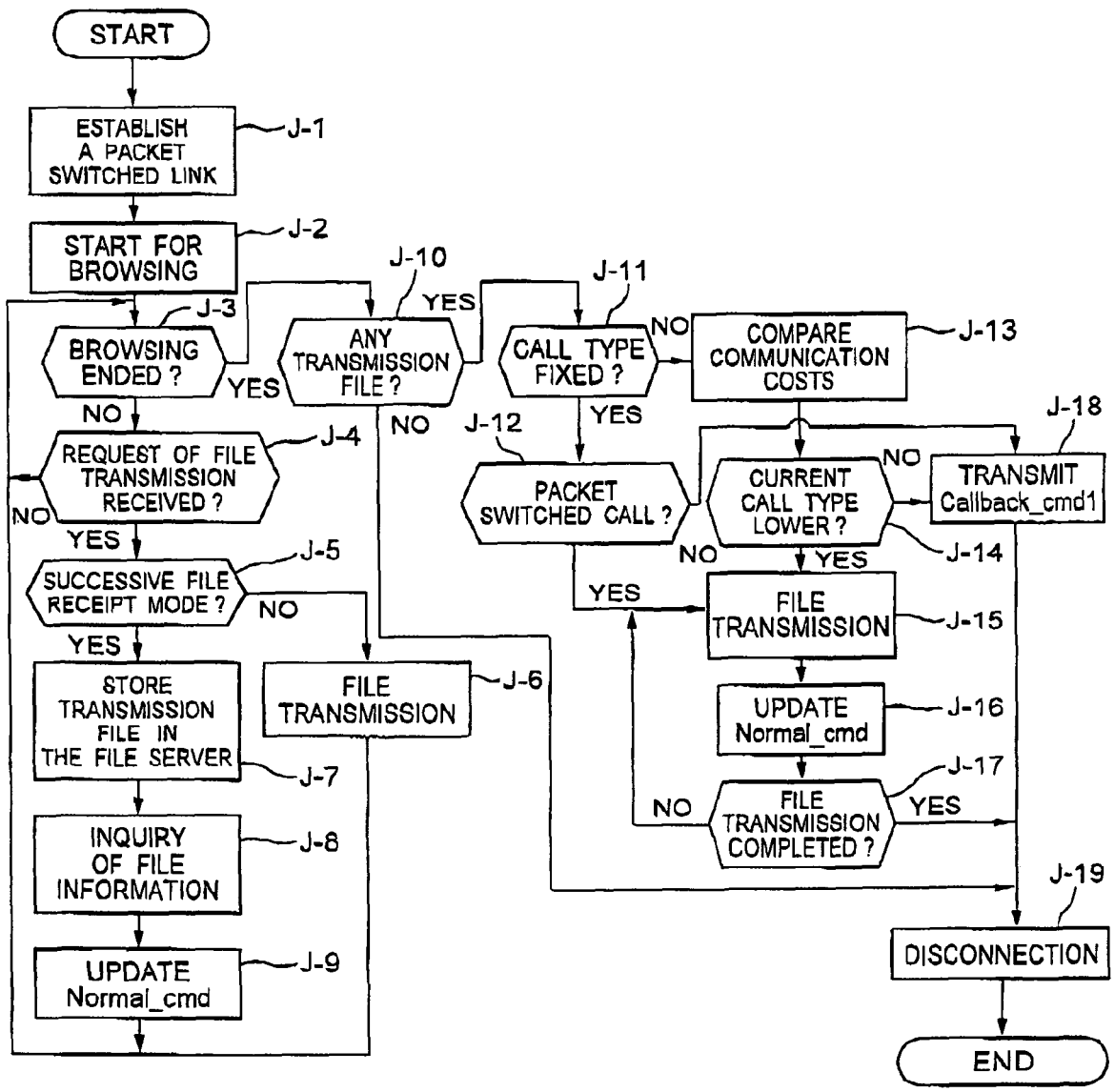
FIG. 19 is a flowchart of the procedure of file receipt by the base station.

Referring to FIG. 19, there is shown the procedure by the base station in the case of file receipt by the mobile terminal during the browsing operation. This procedure will be described in two different groups.

[1] File Receipt During Browsing Operation: Steps J-1 to J-9

After a packet switched link is established (step J-1), the mobile terminal starts for browsing (step J-2). If the mobile terminal requests file transmission during the browsing operation (step J-4), the base station first detects whether or not the mobile terminal is set for a successive file receipt mode (step J-5). If the successive file receipt mode is not selected in the mobile terminal, the base station immediately starts for transmission of the requested file (step J-6). On the other hand, if the successive file receipt mode is selected in the mobile terminal, the base station delivers an inquiry as to the file size etc., edits Normal_cmd, receives the file from the designated address, stores the received file in the file server and updates Normal_cmd (steps J-7 to J-9).

[2] File Receipt After Browsing Operation: Steps J-10 to J-19

If it is judged that the browsing operation is finished (step J-3), and if there is any transmission files directed to the mobile terminal, the base station detects the call type selected by the mobile terminal for an originating call. If the call type in the mobile terminal is fixed to the packet switched call, the base station transmits the selected files successively together with Callback_cmd2. After all the files are transmitted, the base station disconnects the link upon receipt of a disconnection request from the mobile terminal.

On the other hand, if the call type in the mobile terminal is fixed to the circuit switched calls the base station transmits Callback_cmd1, and disconnects the link upon receipt of a disconnection request from the mobile terminal. If the call type is not fixed, the base station compares the communication costs based on the information obtained by an inquiry (step J-13), and transmits successively Callback_cmd2 and the selected files by using the current call type so long as the current call type affords a lower communication cost. If the current call type does not afford a lower communication cost, the base station transmits Callback_cmd1 and disconnects the link upon receipt of a disconnection request from the mobile terminal (steps J-18 to J-19).

Figure 20:
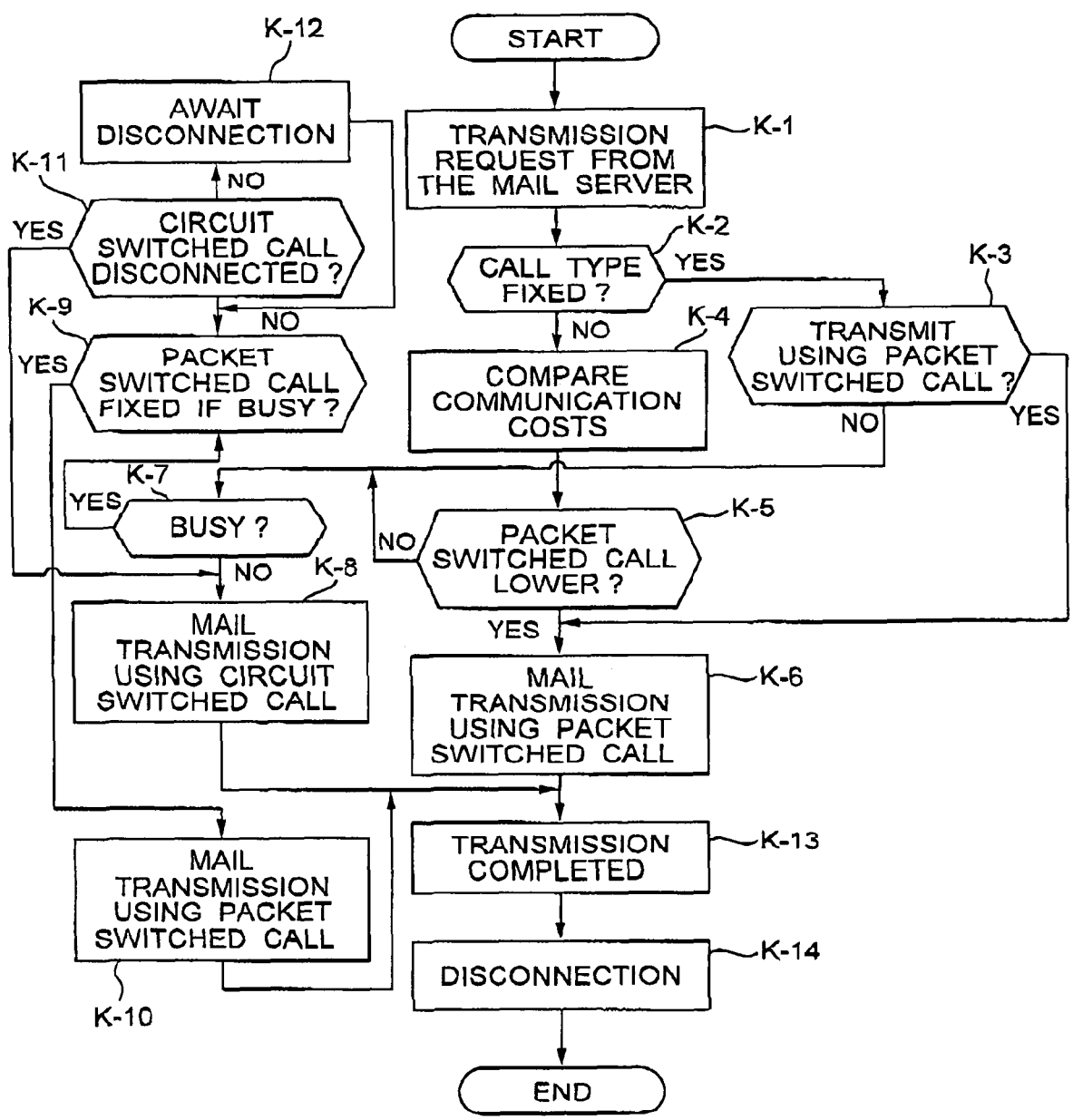
FIG. 20 is a flowchart of the procedure of mail transmission by the base station.

Referring to FIG. 20, there is shown the procedure of mail transmission by the base station. This procedure will be described in five different groups.

[1] Creation of File: Step K-1

The base station responds to a mail transmission request delivered by the mail server (step K-1), thereby starting the mail transmission procedure. The mail server notifies the base station of the number of files to be transmitted and the total file size thereof.

[2] Selection of Call Type: Steps K-2 and K-3

The base station then shifts to a mail transmission processing, to select the call type for the calling. The base station refers the settings notified by the mobile terminal, compares the communication costs only when an automatic selection mode for the call type is set in the mobile terminal, and selects one of the call types affording a lower cost. If the mobile terminal specifies a fixed call type, the base station uses the fixed call type specified by the mobile terminal.

[3] Comparison of Communication Costs: Step K-4

By using the total file size notified by the mail server and the communication cost table for comparison of communication cost, the base station judges which of a packet switched call and a circuit switched call affords a lower communication cost. The communication cost table includes a unit price of the packet informed by the base station upon startup of the mobile terminal is or call origination, and a price per unit hour of the circuit switched call for data transmission, and data transmission rate of the circuit switched call, which are updated at any time upon a change.

[4] Originate Call; Steps K-5 and K-6

The base station starts for data transmission by using the call type as described above. If a packet switched call is selected, the base station transmits the data without any additional procedure. On the other hand, if a circuit switched call is selected, the base station examines whether or not a voice call exists at present for avoiding competition. If a voice call does not exist between the destination mobile terminal and the base station, the base station immediately starts for data transmission.

If there is an existing voice call established, the base station refers to the settings of the mobile terminal If the setting of the mobile terminal indicates a packet switched call, the base station transmits the data by: using a packet switched call. On the other hand, if the setting is other than a packet switched call, the base station operates for polling until the existing call is ended, and starts for data transmission by using a circuit switched call after the existing call is ended.

[5] Mail Transmission and Disconnection: Steps K-13 and K-14

After all the desired mails are successfully transmitted, the base station disconnects the link upon receipt of a disconnection request from the mobile terminal.

In the above embodiment, the comparison of the communication costs between the packet switched call and the circuit switched call allows the user to transmit the data at a lower communication cost. In addition, the file server provided in the base station allows suppression of overhead caused by the routing etc. Further, the successive or batch file transmission allows the user to save the time length for operation.

Figure 21:
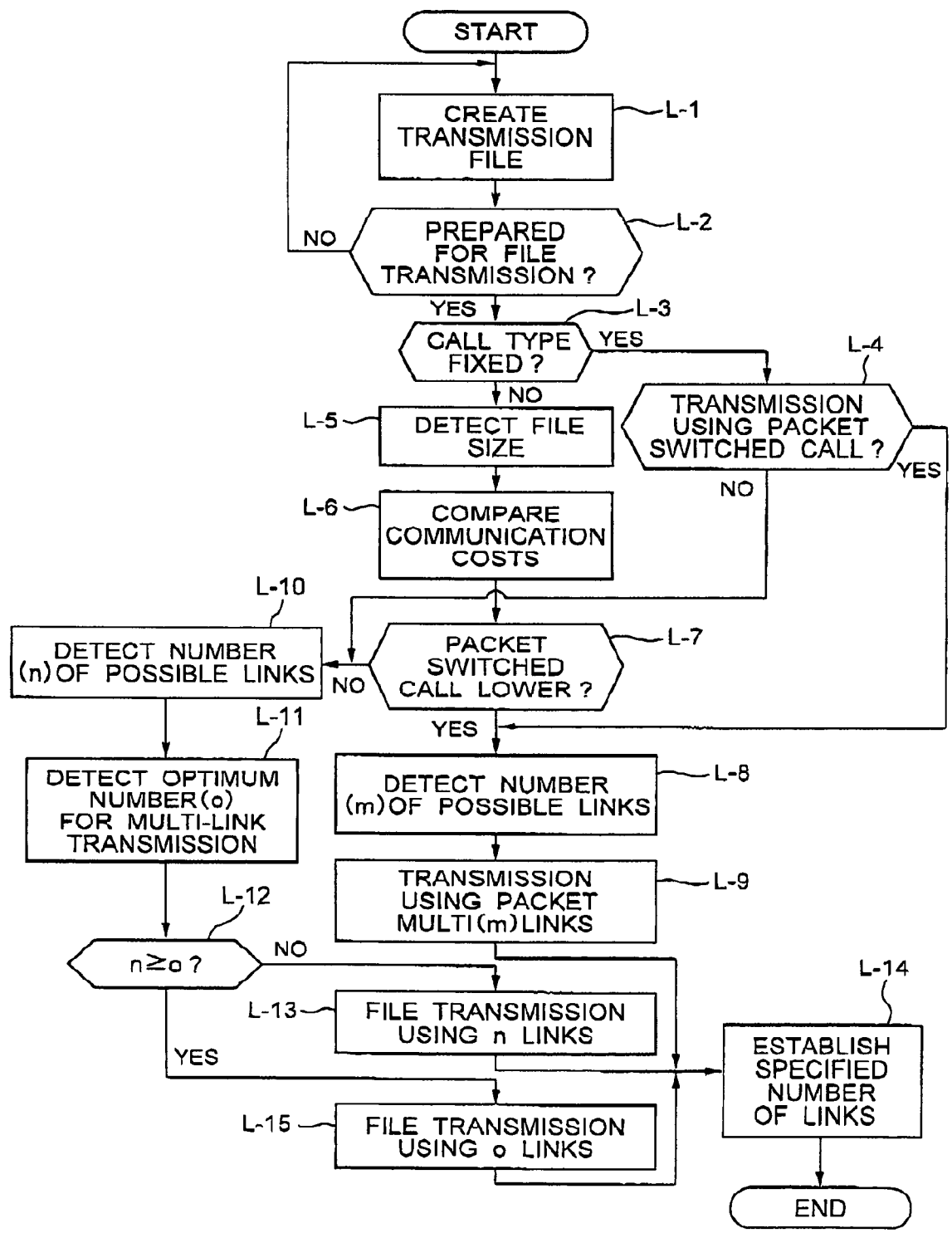
FIG. 21 is a flowchart of the procedure by a mobile terminal in a data transfer system according to a second embodiment of the present invention.

Referring to FIG. 21, there is shown the procedure by the mobile terminal in a communication system according to another embodiment of the present invention. The mobile terminal can use a plurality (m) of packet switched calls and a plurality (n) of circuit switched calls at a time.

In the present embodiment, the procedures are similar to the first embodiment until the mobile terminal compares the communication costs (step L-6). If packet switched calls are selected based on the communication costs, the cost of the data transmission is in proportion to the amount of data to be transmitted. Thus, the use of the plurality of packet switched calls do not substantially increase the communication costs, while transmitting the files via the maximum number (m) of links at a higher speed (step L-7 to L-9).

If circuit switched calls are selected based on the communication costs in step L-7, the costs of the data transmission depend on the number of links used as well as the time length of the data transmission. Thus, the plurality of circuit switched calls may increase the communication costs. In the present embodiment, the mobile terminal detects an optimum number (o) of the links to be used out of the maximum number (n) of the links based on the amount of data to be transmitted (steps L-10 and L-11). If n≧o in step L-12, then the mobile terminal uses o links (L-15), and establish the desired number (o) of links (step L-14), whereas if n<o in step L-12, then the mobile terminal uses n links in a multi-link connection (step L-13), thereby obtaining a higher speed transmission with lower costs.

In the conventional circuit switched call, the user cannot transmit data during performing a voice call by using a mobile terminal having a single line. In the present embodiment, the plurality of links allow the user to obviate such a problem.

The procedure of the mobile terminal as described above may be used in the base station as well. In this case, the "plurality of links" of the mobile telephone may be replaced by the total number of scriber lines connected to the base station minus the number of line busy at that time.

Since the above embodiments are described only for examples, the present invention is not limited to the above embodiments and various modifications or alterations can be easily made therefrom by those skilled in the art without departing from the scope of the present invention.

What is claimed is:

1. A data transfer system comprising:
a plurality of mobile terminals,
at least one base station, and
a communication network for transmitting data between one of said mobile terminals and said base station by using either a packet switched call or a circuit switched call;
wherein at least one of said base station and said mobile terminals comprises
a command file storage section for storing therein a first command file including information of a file size of a data file to be transmitted from the own terminal or own station;
a command file read section for reading said first command file to detect said file size of the data file;
a cost calculation section for calculating a first cost of transmission of the data file by using said packet switched call and a second cost of file transmission of the data file by using said circuit switched call;
a cost comparison section for comparing said first cost and said second cost against each other; and
a call type selection section for selecting one of said packet switched call and said circuit switched call for transmission of the data file based on a result of comparison by said cost comparison section;
wherein each of said mobile terminals comprises a command file creator for creating said first command file;
wherein if the packet switched call is selected the data transmission is started immediately and if the circuit switched call is selected at least one mobile terminal examines whether an existing call is in progress to avoid interference with the existing call and checks a setting that if an existing call is in progress whether to transmit data via packet switched call or poll to determine an end of the existing call to transmit the data via circuit switched call.

2. The data transfer system according to claim 1, wherein said at least one of said base station and said mobile terminals include said mobile terminals.

3. The data transfer system according to claim 1, wherein said at least one of said base station and said mobile terminals includes said base station.

4. The data transfer system according to claim 3, wherein said base station further comprises a command file creator for creating said first command file and a second command file, said second command file including information of requesting one of said mobile terminal of a callback and a call type of said callback.

5. The data transfer system according to claim 4, wherein said second command file further comprises a transfer password, a name of a corresponding command file, and file size data of a data file to be transferred from said base station.

6. The data transfer system according to claim 3, wherein said base station comprises therein a file server.

7. The data transfer system according to claim 1, wherein said at least one of said mobile terminals and said base station further comprises a text editor for creating or editing said first command file.

8. The data transfer system according to claim 1, wherein said at least one of said mobile terminals and said base station further comprises a packet switched call controller and a circuit switched call controller each disposed at an end of a bearer channel and capable of converting a data format of a data file between first, data format adapted to said packet switched call and second data format adapted to said circuit switched call.

9. The data transfer system according to claim 1, wherein said base station has a function of receiving a data file via another communication network from a terminal having an address in the internet specified by one of said mobile terminals.

10. The data transfer system according to claim 1, wherein said first command file is a command file corresponding to a data file to be transferred from said at least one of said mobile terminals and said base station.

11. The data transfer system according to claim 1, wherein said at least one of said mobile terminals and said base station has a function of transmitting a plurality of data files by using at least a selected one of a plurality of said packet switched calls and/or at least a selected one of a plurality of circuit switched calls.

12. A method for transferring a data file between one of a plurality of mobile terminals and a base station, said method comprising the steps of:

reading a first command file of the data file to detect a file size of the data file;

calculating a first cost of transmission of the data file by using a packet switched call and a second cost of file transmission of the data file by using a circuit switched call;

a cost comparison section for comparing said first cost and said second cost against each other; and selecting one of said packet switched call and said circuit switched call for transmission of the data file based on a result of comparison by said cost comparing step;

wherein each of said mobile terminals comprises a command file creator for creating said first command file;

wherein if the packet switched call is selected the data transmission is started immediately and if the circuit switched call is selected at least one mobile terminal examines whether an existing call is in progress to avoid interference with the existing call and checks a setting that if an existing call is in progress whether to transmit data via packet switched call or poll to determine an end of the existing call to transmit the data via circuit switched call.

13. The method according to claim 12, wherein at least one of said base station and said mobile terminals has a function of transmitting a plurality of data files by using at least a selected one of a plurality of said packet switched calls and/or at least a selected one of a plurality of circuit switched calls.

* * * * *